(12) United States Patent
Jainek

(10) Patent No.: US 10,675,574 B2
(45) Date of Patent: Jun. 9, 2020

(54) FILTER DEVICE COMPRISING AN ADAPTER PIECE

(71) Applicant: MANN+HUMMEL GMBH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 263 days.

(21) Appl. No.: 15/171,344

(22) Filed: Jun. 2, 2016

(65) Prior Publication Data

US 2016/0271539 A1 Sep. 22, 2016

Related U.S. Application Data

(63) Continuation of application No. PCT/EP2014/072513, filed on Oct. 21, 2014.

(30) Foreign Application Priority Data

Dec. 2, 2013 (DE) .......................... 10 2013 018 045

(51) Int. Cl.
*B01D 35/30* (2006.01)
*B01D 35/00* (2006.01)
*B01D 35/147* (2006.01)

(52) U.S. Cl.
CPC ......... *B01D 35/306* (2013.01); *B01D 35/005* (2013.01); *B01D 35/147* (2013.01); *B01D 2201/0415* (2013.01)

(58) Field of Classification Search
CPC .. B01D 35/306; B01D 35/005; B01D 35/147; B01D 2201/0415
See application file for complete search history.

(56) References Cited

U.S. PATENT DOCUMENTS

| 3,589,517 | A | 6/1971 | Palmai |
| 4,497,706 | A | 2/1985 | Pickett |
| 6,579,448 | B2 | 6/2003 | Dworatzek |
| 8,020,709 | B2 | 9/2011 | Sakraschinsky |
| 2001/0035376 | A1* | 11/2001 | Dworatzek ............ B01D 29/21 |
| | | | 210/440 |
| 2007/0215561 | A1 | 9/2007 | Yates et al. |
| 2009/0008322 | A1* | 1/2009 | Sakraschinsky ..... B01D 27/005 |
| | | | 210/442 |

FOREIGN PATENT DOCUMENTS

| CN | 1833749 B * | 6/2011 | ........... B01D 29/111 |
| DE | 102009033263 A1 | 2/2010 | |
| EP | 1199093 A1 | 4/2002 | |
| GB | 1444083 A | 7/1976 | |
| WO | 2014082762 A1 | 6/2014 | |

* cited by examiner

*Primary Examiner* — Krishnan S Menon
*Assistant Examiner* — Waqaas Ali
(74) *Attorney, Agent, or Firm* — James Hasselbeck

(57) ABSTRACT

A filter device includes a hollow cylindrical filter element and a bypass valve, the valve body of which rests against an adapter piece that is arranged on the end face of the filter element. At least one bypass opening is integrated into the adapter piece.

10 Claims, 2 Drawing Sheets

FILTER DEVICE COMPRISING AN ADAPTER PIECE

TECHNICAL FIELD

The invention relates to a filter device, to a filter element for receiving the filter device, and to an adapter piece for arranging on the filter element.

BACKGROUND

DE 10 2009 033 263 A1 describes a fluid filter that has a hollow cylindrical filter element, through which fuel flows radially from the exterior towards the interior and that is covered on its end faces by end discs. For stabilization, inserted into the interior of the filter element is a lattice-shaped support body in which is received a bypass valve having a spring-loaded valve body that during regular filtration operation closes a flow opening of the cylindrical interior in one of the end discs. In this condition, the raw fluid flows through the filter element radially from the exterior towards the interior and is axially discharged from the chamber via the side axially opposing the bypass valve. If the flow resistance is too high due to soiling of the filter element, the bypass valve opens so that the raw fluid can travel directly to the clean side, bypassing the filter element.

EP 1 199 093 A1 describes a comparable fluid filter that also has a bypass valve in the interior of a hollow cylindrical filter element, the valve body of which is force-actuated using the force of a spring element against the opening in an end-face end disc of the filter element.

SUMMARY

The underlying object of the invention is to design a filter device having a hollow-cylindrical filter element and integrated bypass valve in a structurally simple manner that is versatile in use.

The filter device according to the invention is used for filtering a fluid, preferably a liquid such as e.g. a lubricant or fuel. It is possible that the filter device may also be used for filtering a gaseous fluid. The filter device includes a hollow cylindrical filter element that is received in a filter housing and through which the fluid to be cleaned flows radially. The direction of flow is preferably radially from the exterior towards the interior.

The interiorly disposed chamber in the filter element forms a flow space that, during radial flow from the exterior towards the interior, represents the clean side from which the cleaned fluid flows out axially. The two opposing end faces of the filter element are each covered by an end disc, wherein a flow opening for the axial passage of the fluid is added to at least one end disc. The filter medium body of the filter element is embodied, for instance, as a pleated filter and comprises paper or non-woven material.

Integrated into the filter element is a bypass valve, the valve body of which is force-actuated into the closed position by a spring element. In the normal operating mode, the bypass valve is closed, the valve body seals a bypass opening between the interiorly disposed chamber in the filter element and the space surrounding the filter element. If the pressure in the raw fluid rises above a threshold, the filter body is displaced against the force of the spring element acting thereon out of the closed position into the opening position, so that the bypass is exposed and the raw fluid can flow immediately from the raw side to the clean side, bypassing the filter medium body. In the normal mode—the regular filtration mode with a pressure in the raw fluid below the threshold—the bypass valve is closed so that the raw fluid flows through the filter medium body of the filter element.

An adapter piece that is embodied separately from the end discs is arranged on the end face of the filter element and cooperates with the valve body of the bypass valve. The adapter piece preferably embodies the valve seat, with respect to which the valve body of the bypass valve is sealed when closed. The adapter piece may limit the adjustment travel of the valve body in the closed position of the valve. The adapter piece is thus a component of the bypass valve. The adapter piece also has a flow connection section via which the interior in the hollow cylindrical filter element may be connected to a connecting line or a connecting tube for the fluid. The adapter piece thus has two functions: First, the adapter piece cooperates with the valve body of the bypass valve in that the valve body is force-actuated by the force of the spring element against a bypass opening in the adapter piece, and second, the flow is guided between the interior in the filter element and a connecting line via the flow connection section of the adapter piece. The bypass opening in the adapter piece is preferably disposed radially outside of the flow connection section.

Due to this embodiment of the adapter piece, it is possible to perform the flow guidance in the normal mode, with a closed bypass valve, and to perform the flow guidance via the bypass valve on the same end face of the filter element. Thus, for instance when used as an oil filter in an upright standing position with a vertical longitudinal filter axis, the lower end of the filter device may project into the oil sump in an oil pan without there being a danger that very soiled oil will travel from the bottom of the oil pan directly from the raw side to the clean side when the bypass valve arranged on the upper end of the oil filter is opened. The bypass valve is disposed adjacent to the upper end disc of the filter element. The interior in the hollow cylindrical filter element forms the clean side from which the cleaned fluid is discharged via the flow connection section of the adapter piece during normal operation.

The adapter piece is seated on the end face of the filter element and overlaps the interiorly disposed chamber. The flow connection section preferably runs as a connector in the axial direction and can be used for connecting another tube line, via which the cleaned fluid is discharged. The connecting piece advantageously receives a circumferential sealing element in order to enable a flow-tight connection to the other tube line or a counter-piece. The sealing element may be embodied as an O-ring, a rectangular seal, or sealing bead. The material used may be an elastomer or non-woven fabric, for instance. Alternatively, the sealing element may also be molded directly to the connecting piece, for instance using a 2K injection molding method, or may be formed of the same material as the adapter piece.

The at least one bypass opening, preferably a plurality of bypass openings, in the end-face adapter piece are disposed radially within the diameter of the interiorly disposed chamber in the filter element, so that when the valve body opens, there is an immediate flow connection between the space surrounding the end face of the filter element and the interiorly disposed chamber. The bypass openings are disposed radially outside of the connecting piece. In one preferred arrangement, a plurality of openings are arranged spaced radially annularly about the connecting piece. When the valve body opens, raw fluid flows through the bypass openings into the chamber, from which the uncleaned fluid is discharged axially via the connecting piece in the adapter piece.

The adapter piece is seated on the end face of the filter element and overlaps the chamber in the filter element in a flow-tight manner. In accordance with one advantageous embodiment, the adapter piece also forms one of the end-face end discs; in this case, the adapter piece may be bonded or glued to the end face of the filter element. In one alternative embodiment, the adapter piece may be permanently joined to an end disc of the filter element, in particular by welding to the end face of the filter element, for instance by means of butt welding.

However, it is also possible for there to be an embodiment of the adapter piece and end disc, wherein the separate adapter piece completely or partially overlaps the end disc radially. Arranged between the end-face end disc on the filter element and the seated adapter piece may be a sealing element or a non-woven material ring that is arranged directly adjacent to the flow opening in the end disc and thus to the chamber in the filter element. The sealing element or non-woven material ring may possibly have an L-shaped section and project axially into the chamber. The sealing element or non-woven material ring prevents incorrect flows between the end disc and the adapter piece from being able to occur in the normal mode between the environment and the chamber. The sealing element or non-woven material ring may possibly also be embodied as an adhesive layer with which the adapter piece is glued to the end face of the filter element.

In accordance with another useful embodiment, the adapter piece has at least one clamping element that projects into the chamber of the filter element and that connects the adapter piece with positive or non-positive fit to the filter element and axially secures it to the filter element. For instance, a plurality of clamping elements may be molded to the adapter piece around its circumference in order to retain the adapter piece on the filter element with uniform force distribution. The clamping element advantageously axially overlaps the end disc and projects radially into the filter center or the filter medium body of the filter element.

A support or center tube may be integrated into the filter element, the wall of the support or center tube having sufficiently large through-flow openings that the radial through-flow of the filter element is not prevented. The center tube imparts additional stability to the filter element. At the same time, the center tube may be used for securing and retaining the valve body and the spring element that urges the valve body toward the closed position of the bypass valve. The valve body is for instance retained with positive fit on the center tube, for instance clipped into the center tube, wherein an axial relative movement of the valve body relative to the center tube is possible in order to be able to perform the opening and closing movement.

The filter device may be embodied in two parts in that the housing component along with the center tube and the components of the bypass valve form a first component and the filter element along with the adapter piece form the second component, wherein the two components may be combined to create the filter device.

The clamping element on the adapter piece exercises a radially outwardly directed force onto the filter medium body or the material of the end disc, which extends axially slightly into the material of the filter medium body.

BRIEF DESCRIPTION OF THE DRAWINGS

Additional advantages and useful embodiments may be found in the other claims, description of the figures, and drawings.

Identical components are provided with the same reference numbers in the figures.

DETAILED DESCRIPTION

Figure 1:
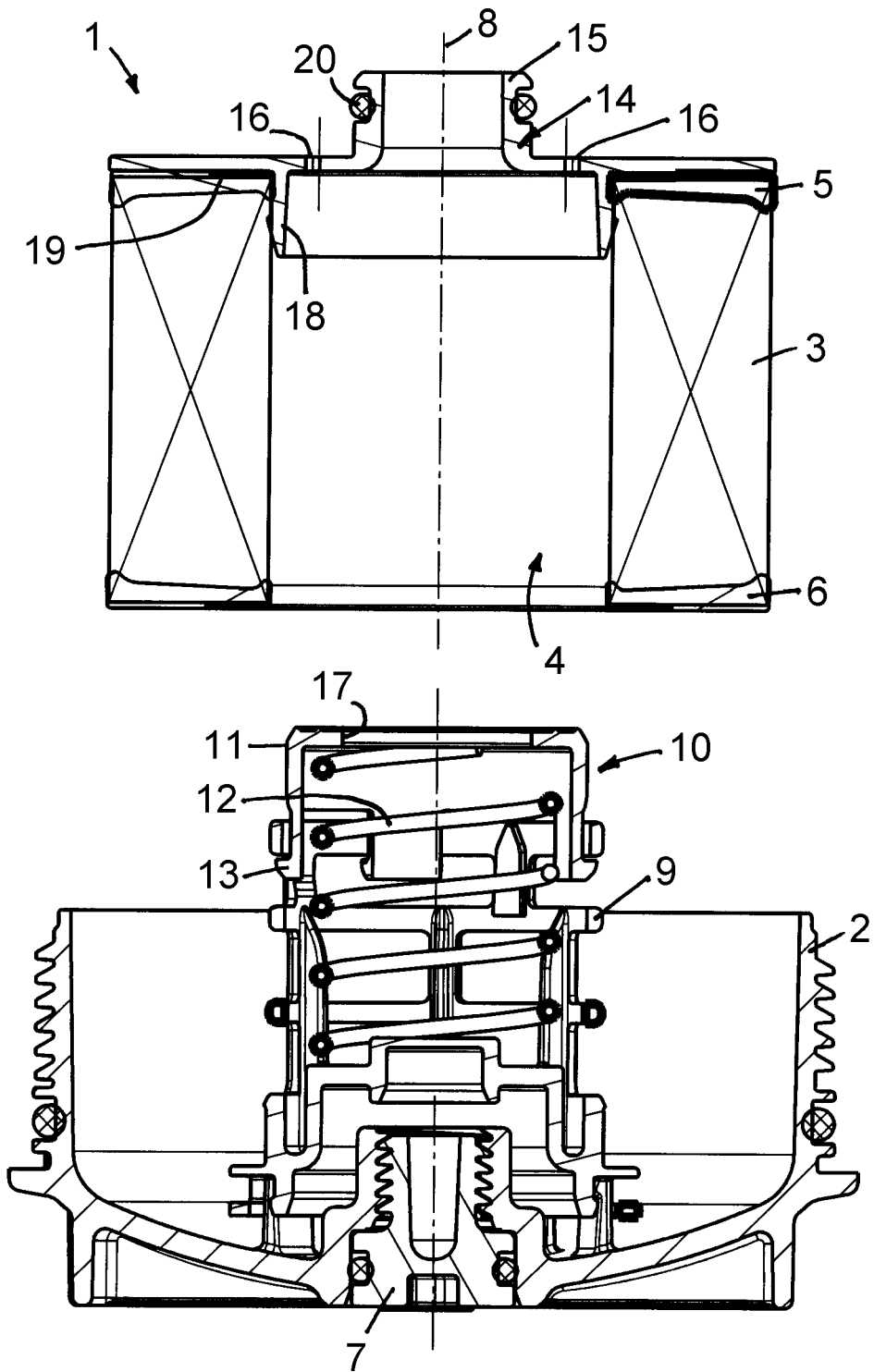
FIG. 1 depicts a section through the individual components of a filter device embodied as an oil filter, prior to assembly, having a hollow cylindrical filter element on the end face of which an adapter piece is seated, and having a receiving housing component with a center tube and a valve body, retained on the center tube, of a bypass valve.
Figure 2:
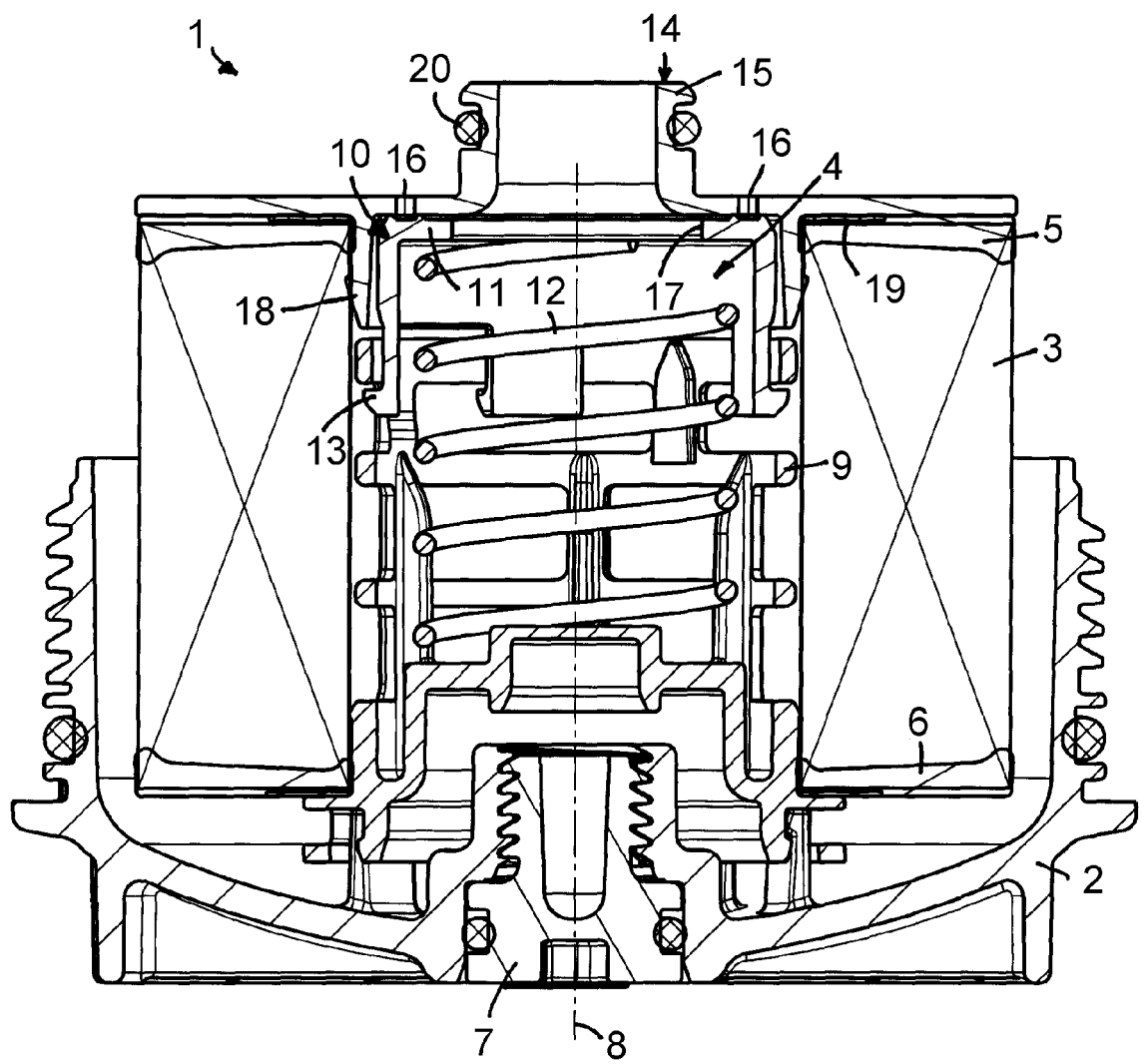
FIG. 2 depicts the filter device in accordance with FIG. 1 when assembled.

FIGS. 1 and 2 depict a filter device 1, embodied as an oil filter, having a housing component 2, which is part of a filter housing, and a filter element 3 that may be inserted in the housing component 2 and that is embodied as a hollow cylinder and through which flows, from the exterior to the interior, the fluid to be cleaned. The filter element 3 has an interiorly disposed chamber 4 that forms the clean side of the filter element. End discs 5, 6 that axially close the filter medium body of the filter element 3 in a flow-tight manner are disposed on two end faces of the filter element 3.

The housing component 2 is embodied as a screw-in unit that forms a cover, and has exteriorly disposed teeth that make it possible to screw the housing component 2 into a receiving housing from below. A drain screw 7, which is in fluid connection with the chamber 4 in the filter element 3 when assembled, is disposed in the bottom area of the housing component 2. Oil that has collected in the housing component 2 may be drained by unscrewing the drain screw 7. When assembled, the filter device 1 assumes the position depicted in FIG. 2 in which the filter longitudinal axis 8 runs at least approximately vertically.

The filter device 1 furthermore includes a center tube 9 that, when assembled, projects into the chamber 4 in the filter element 3 and additionally stabilizes the filter element. The center tube 9 is positioned against the inner wall of the chamber 4 and has large flow openings through which the fluid may pass when it flows through the filter element. The center tube 9 is retained on the bottom of the housing component 2, for instance by means of a catch mechanism.

The filter element 3 is equipped with a bypass valve 10 that, when open, directly connects the raw side to the clean side so that the fluid travels directly into the chamber 4, bypassing the filter medium body. The bypass valve 10 includes a valve body 11 that is retained, axially adjustably, on the center tube, and a spring element 12 as valve spring that is supported on the center tube 9 and urges the valve body 11 in the axial direction towards the closed position. The valve body 11 is latched to the center tube 9 via a hook-shaped section 13 that has a hook nose oriented radially outwardly in that the hook-shaped section 13 engages a bar that runs circumferentially on the center tube 9. This makes it possible for the valve body 11 to carry out an axial adjustment movement between its closed position and its open position relative to the center tube 9; at the same time, the valve body 11 is retained securely axially on the center tube 9. When assembled, the valve body 11 and the spring element 12 are disposed in the chamber 4 of the filter element 3.

Seated on the upper end face of the filter element 3 is an adapter piece 14 that cooperates with the bypass valve 10 and also produces, via a connecting piece 15, a flow connection between the chamber 4 in the filter element 3 and a line or tube to be connected to the connecting piece 15. The adapter piece 14 is disposed on the top end disc 5 of the filter element 3 and covers at least part of the end disc 5, and may cover all of it. The adapter piece 14 covering the chamber 4 has bypass openings 16 that are disposed radially outside of the connecting piece 15 extending axially, but radially inside the diameter of the chamber 4. The chamber 4 can communicate with the surrounding space via the bypass openings 16.

During normal operation, the bypass openings 16 in the adapter piece 14 are closed by the valve body 11, which has a central recess 17 via which the chamber 4 communicates with the connecting piece 15, but at its end face is embodied like a disc, wherein the disc edge is positioned against the inside of the adapter piece 14 and closes the bypass openings 16. However, if the pressure in the raw fluid on the outside of the filter element 3 exceeds a limit or threshold value, the valve body 11 is displaced axially, against the force of the spring element 12 acting on it, into the open position by the raw fluid, whereupon the raw fluid can flow through the opened bypass openings 16 into the chamber 4 in the filter element 3 and from here is discharged via the connecting piece 15.

On its side axially opposing the connecting piece 15, the adapter piece 14 has clamping elements 18 that project into the chamber 4 and are positioned directly against the inner wall of the filter medium body, of the filter element 3, limiting the chamber 4. On their radially exterior side, the clamping elements 18 have a clamping projection that projects into the material of the filter medium body and catches there. In this manner the adapter piece 14 is securely retained in its axial position on the Filter element 3.

It is possible for the adapter piece to be joined to the filter element by gluing, wherein in this case the clamping element is not needed.

An annular sealing element or a non-woven material ring 19 may be placed onto the upper end disc 5 or immediately adjacent to the opening of the chamber 4.

An exteriorly disposed sealing ring 20 that is inserted into a circumferential groove on the connecting piece 15 is placed onto the connecting piece 15 of the adapter piece 14. A hose or tube or a suitable mating part may be placed onto the connecting piece 15 or the connecting piece may be inserted into a mating piece, wherein the sealing ring 20 ensures a flow-tight connection.

What is claimed is:

1. A filter device for filtering a fluid, comprising:
   a filter housing including:
      a filter housing center tube having a first axial end fastened directly onto an interior wall of the filter housing, the filter housing center tube having an outer wall formed as a plurality of ring-shaped ribs closing about a hollow interior of the filter housing center tube, the plurality of ring-shaped ribs spaced apart axially, the axial spacing forming a plurality of radial flow-through openings extending through the outer wall from an exterior side of the filter housing center tube to the hollow interior of the filter housing center tube;
      wherein the filter housing center tube has a bypass valve assembly including:
         a spring arranged within the filter housing center tube; and
         a valve body slidably mounted on an opposite second axial end of the filter housing center tube, valve body loaded by the spring and moveable axially relative to the filter housing center tube;
         wherein the valve body projects axially outwardly beyond the second axial end of the filter housing center tube; and
         wherein the valve body has at least one hook projection, the at least one hook projection projecting radially outward from the valve body and projecting radially outward through a respective one of the plurality of radial flow-through openings of the filter housing center tube, wherein the at least one hook projection is axially captured in and axially movable in the respective one of the plurality of radial flow-through openings to permit an axial movement of the valve body from an open to a closed position,
         the at least one hook projection slidably fixing the valve body to the filter housing center tube, and slidably fixing the valve body onto the interior wall of the filter housing through the filter housing center tube; and
   a hollow cylindrical filter element installed onto the filter housing center tube within an interior of the filter housing, the filter element including:
      a filter medium, arranged as a cylindrical closed filter medium surrounding and radially enclosing around a central axis, wherein the filter medium defines a hollow interior chamber elongated along the central axis, the cylindrical closed filter medium having a first axial end face and an opposing second axial end face;
      wherein axial, as used herein, is a direction defined by the central axis;
      wherein radial, as used herein, is a direction traverse to the central axis;
      a first axial end disc arranged on the first axial end face of the cylindrical closed filter medium;
      a second axial end disc arranged on an opposing second axial end face of the cylindrical closed filter medium;
      wherein the hollow cylindrical filter element is configured to filter fluid flowing radially through the filter medium;
      an adapter piece is arranged on the first axial end disc, the adapter piece including
         a tubular connecting piece projecting axially outwardly away from an axially outer side of the adapter piece, the tubular connecting piece forming a flow passage opening that opens into the hollow interior chamber; and
         at least one bypass opening positioned radially outwardly away from an outer side of the tubular connecting piece, the at least one bypass opening extending through the adapter piece to open into the hollow interior chamber;
      wherein, when the filter element is installed in the filter housing, the filter housing center tube on the interior wall is inserted through the opening of the second axial end disc and into the hollow interior chamber of the filter element, such that the valve body is arranged to close against the at least one bypass opening of the adapter piece;
      wherein the spring loads the valve body to close the at least one bypass opening to flow;
      wherein the adapter piece overlaps the interior chamber in the filter element in a flow-tight manner;
      wherein the adapter piece has at least one clamping element arranged in the hollow interior chamber of the filter medium, the at least one clamping element having a clamping projection that projects radially into the filter medium and catches there, securing the adapter piece against an outer side of the first axial end disc.

2. The filter device in accordance with claim 1, wherein the clamping element clamps into a radially inner flow face of the filter medium in the hollow interior chamber.

3. The filter device in accordance with claim 2, wherein the clamping element axially overlaps a respective one of the end discs and projects radially into the filter medium body of the filter element through the respective end disc.

4. The filter device in accordance with claim 1, wherein the adapter piece is permanently welded or glued onto a respective one of the end discs of the filter element.

5. The filter device in accordance with claim 1, wherein the adapter piece covers the one of the end faces of the filter element.

6. The filter device in accordance with claim 1, wherein the tubular connecting piece is formed together with and in one piece with the adapter piece as a unitary one-piece component, the tubular connecting piece extending axially outwardly away from the filter medium.

7. The filter device in accordance with claim 6, further comprising:
a sealing ring is arranged directly on the tubular connecting piece or a sealing geometry is molded on the connecting piece.

8. The filter device in accordance with claim 1, wherein the spring applies an axial spring force to the valve body relative to the filter housing center tube, to axially move the valve body to close against the at least one bypass opening of the adapter piece.

9. The filter device in accordance with claim 1, wherein
a sealing element or a non-woven ring is arranged between the adapter piece and a respective one of the end discs on which the adapter piece is arranged;
wherein the sealing element or a non-woven ring is arranged on or molded directly on either the adapter piece or the respective one of the end discs.

10. The filter device in accordance with claim 1, wherein the adapter piece also formed with the first axial end disc as a single unitary one-piece component.

\* \* \* \* \*